(12) United States Patent
Yasaka et al.

(10) Patent No.: US 6,313,226 B1
(45) Date of Patent: Nov. 6, 2001

(54) OLEFINIC RESIN COMPOSITION AND THEIR MOLDINGS

(75) Inventors: Naoto Yasaka; Takanori Sueda, both of Ichihara (JP)

(73) Assignee: Mitsui Chemicals Inc., Tokyo (JP)

( * ) Notice: Subject to any disclaimer, the term of this patent is extended or adjusted under 35 U.S.C. 154(b) by 0 days.

(21) Appl. No.: 09/511,110

(22) Filed: Feb. 23, 2000

(30) Foreign Application Priority Data

Mar. 31, 1999 (JP) .................................................. 11-091835

(51) Int. Cl.$^7$ ............................ C08L 23/06; C08L 23/02; C08L 23/16; B32B 3/26; B32B 23/08

(52) U.S. Cl. .......................... 525/240; 524/515; 524/528; 428/304.4; 428/513

(58) Field of Search ................................ 428/304.4, 513; 524/515; 525/240

(56) References Cited

U.S. PATENT DOCUMENTS

| | | | |
|---|---|---|---|
| 3,839,238 | * | 10/1974 | Ealding . |
| 4,767,580 | * | 8/1988 | Shingo et al. . |
| 5,236,963 | * | 8/1993 | Jacoby et al. . |
| 5,277,988 | | 1/1994 | Sugi et al. . |

FOREIGN PATENT DOCUMENTS

| | | |
|---|---|---|
| 9847956 | 10/1998 | (WO) . |
| 9907785 | 2/1999 | (WO) . |

OTHER PUBLICATIONS

Abstract of Japanese Laid–Open Patent Publication No. 17724/1998.

* cited by examiner

*Primary Examiner*—Tae H. Yoon

(57) ABSTRACT

An olefinic resin composition having the specific range of density, melt flow rate (MFR), viscoelastic properties and melt tension is obtained. The composition comprises (A) a polyethylene, (B) an ethylene/α-olefin copolymer having the MFR of 0.1 to 10, and (C) an ethylene/α-olefin copolymer or a propylene/α-olefin copolymer having the MFR of 20 to 200. When the composition is processed by calendering, its feed to the rolls and take-up from the rolls are satisfactory, and high-speed formation of sheets having high accuracy in thickness is possible. The compounding of a fire retardant and a foaming agent to the composition enables fire-retardant foamed sheets being bulky and giving a good feel to be obtained. The lamination of these sheets onto the paper substrate is suitable for wall paper.

23 Claims, No Drawings

OLEFINIC RESIN COMPOSITION AND THEIR MOLDINGS

BACKGROUND OF THE INVENTION

1. Field of the Invention

The present invention relates to a polyolefin resin composition suitable for use in the forming of flexible sheets, a foamed resin sheet manufactured therefrom, and a wall paper using such sheet. More specifically, the present invention is concerned with a resin composition having excellent roll processability and flexibility, a foamed resin sheet rollings manufactured therefrom, and a wall paper using such sheet.

2. Description of the Background

Wall papers have such structure that a foamed synthetic resin sheet is laminated onto one side of the paper substrate. Up to the present, sheets made of polyvinyl chloride resin have been used mainly for such foamed synthetic resin sheet. Polyvinyl chloride resin sheets have been evaluated highly and utilized because of their good moldability, fire-retardant property and excellent workability. However, there is a growing trend for polyvinyl chloride resin sheets to be gradually replaced by substitute materials on account of concerns about environmental problem due to their own combustion gases and the effects of the plasticizer contained in them on human health.

From a viewpoint of environmental and health concerns, polyolefin resins are safe materials involving little concerns about environmental problem and effects on health. On the other hand, it has been pointed out that polyolefin resins do not show satisfactory sheet formability on calendering rolls, exhibit a low expansion ratio in the processing of foaming, provide sheets having the surfaces giving a different feel from that of the conventional polyvinyl chloride sheets, and have disadvantages to be improved such as the laminates with paper tending to curl.

In this respect, the selection of an ethylene/α-olefin copolymer from among polyolefin resins allows foamed sheets having excellent flexibility and foamability to be obtained. However, as the resin does not feed well between the calendering rolls, the resin shows poor high-speed processability and has disadvantages to be improved such as formed sheets exhibiting a decline in the accuracy in their thickness.

On the other hand, the Japanese Laid Open Patent Publication No.17724/1998 discloses a wall paper using a sheet with excellent calendering roll processability and foamability which uses a particular ethylene/α-olefin copolymer. However, the sheet shows high impact resilience and difficulty in cutting because of its rubber elasticity and therefore does not always display satisfactory workability. It follows therefore that as things stand now, even if any type of polyolefin resin is selected, sheets having excellent moldability and physical properties cannot be obtained.

SUMMARY OF THE INVENTION

Accordingly it is an object of the present invention to provide an olefin resin composition which makes high-speed sheet formation possible because of a reduction tack to the rolls and enable high-expansion-ratio sheet having of high accuracy in thickness and excellent workability to be formed.

Another object of the present invention is to provide a foamed resin sheet obtained from the olefin resin composition and a wall paper using the foamed resin sheet.

Other and further objects, features and advantages of the present invention will appear more fully from the following descriptions.

The present invention relates to an olefinic resin composition comprising olefinic resins which have the following physical properties described in (a) through (e) below:

(a) A density is 0.870 to 0.890 (g/cm$^3$).

(b) A melt flow rate as measured at 190° C. and under a load of 2.16 kg is 2 to 10 (g/10 min).

(c) A Δ tan δ at 120° C. is 0.5 to 1.30, wherein, Δ tan δ is an absolute value of a difference between ln(tan δ) at 1 (rad/sec) and ln(tan δ) at 100 (rad/sec).

(d) A tan δ as measured at 120° C. and 10 (rad/sec) is 0.3 to 2.0.

(e) A melt tension at 150° C. is 25 to 200 mN.

Furthermore, the present invention relates to an olefinic resin composition comprising components (A), (B) and (C) which meet the above requirements (a) through (e). Wherein, a component (A) is a polyethylene which has a density of 0.900 to 0.925 (g/cm), a melt flow rate of 0.5 to 30 (g/10 min) and an ethylene unit content of not less than 95 mol %; a component (B) is an ethylene/α-olefin copolymer which has a density of 0.855 to 0.880 (g/cm$^3$), a melt flow rate of 0.1 to 10 (g/10 min), a crystallinity of not more than 30% as measured by X-ray diffractometry, and an ethylene unit content of 70 to 95 mol %; and a component (C) is an ethylene/α-olefin copolymer which has a density of 0.855 to 0.880 (g/cm$^3$), a melt flow rate of 20 to 200 (g/10 min), a crystallinity of not more than 30% as measured by X-ray diffractometry, and an ethylene unit content of 70 to 95 mol %, or a propylene/α-olefin copolymer having a propylene unit content of 50 to 90 mol %.

Especially, the component composition ratio of the olefinic resin composition of the invention is preferably 5 to 40 wt % for the component (A), 10 to 90 wt % for the component (B), and 5 to 60 wt % for the component (C), wherein a total amount of (A), (B) and (C) is 100 wt %. A fire-retardant sheet can be obtained by compounding 50 to 200 parts by weight of a fire retardant to 100 parts by weight of the olefinic resin composition.

Moreover, the present invention relates to a foamed resin sheet formed from the resin composition. A laminate of the foamed resin sheet with a paper substrate may be utilized satisfactorily as a wall paper.

DETAILED DESCRIPTION OF THE PREFERRED EMBODIMENTS

Next, a specific explanation of the present invention is given step by step.

Physical Properties of the Olefinic Resin Composition

The olefinic resin composition of the invention is prepared from olefinic resins as the principal component. The resin composition shows an outstanding performance in moldability and use with respect to calendering processability, extrudability, foamability and workability, and provides sheets showing excellent physical properties with the accuracy in thickness and feel, if the values of the density, the melt flow rate, the viscoelastic properties as represented by Δ tan δ and tan δ, and the melt tension of the resin composition are so controlled that they fall within the specified ranges as described below.

(a) When the density as measured on the basis of ASTM D-1505 is in a range of 0.870 to 0.890 (g/cm$^3$), the tack of the formed sheet to the rolls declines, and its laminate with the paper substrate does not readily curl.

(b) When the melt flow rate as measured at 1 90° C. and under a load of 2.16 kg on the basis of ASTM D-1238 is in a range of 2 to 10 (g/10 min), the resin feeds well between a pair of rolls at the time of the processing of calendering, and it is possible to reduce the exothermic value by shear force in the extruder at the time of extrusion to a low level, avoiding a sharp rise in the resin temperature. Consequently, it is possible to form a sheet without involving the decomposition of the foaming agent in the extruder at the time of foam extrusion.

(c) The $\Delta$ tan $\delta$ is the absolute value of the difference between tan $\delta$ at 1 (rad/sec) and tan $\delta$ at 100 (rad/sec), calculating by the following formula, as measured at a strain of 2% and a temperature of 120° C. using a dynamic viscoelasticity testing device (rheometer) and a disc-shaped test specimen 2 mm in thickness and 25 mm in diameter:

$$\ln(\tan \delta_{1 \ rad/sec})-\ln(\tan \delta_{100 \ rad/sec})$$

When this value is in a range of 0.5 to 1.30, the feed of the resin between the calendering rolls becomes satisfactory. In this case, the tan $\delta$ value is a physical property value called loss tangent, which is an index representing dynamic elastic properties. Specifically, tan $\delta$ can be expressed by the ratio of loss elastic modulus G" to storage elastic modulus G'. That is, $$G''/G'=\tan \delta$$

(d) When the tan $\delta$ value as measured under the conditions of 120° C. and 10 (rad/sec) is in a range of 0.3 to 2.0, the coiling of the sheet onto the calendering rolls is avoided.

(e) When the melt tension is in a range of 25 to 200 mN, the sheet is taken off smoothly from the calendering rolls, and the expansion ratio may be increased.

Further, melt tension is a value that can be determined by measuring stress when the resin in melted state is drawn at a constant rate. The actual measurement of melt tension was carried out by use of the melt tension tester available from Toyo Seiki Seisakusho Co., Ltd. under the following conditions: a resin temperature of 150° C., an extrusion rate of 15 mm/min, take-off speed of 15 m/min, a nozzle diameter of 3.8 mm and a nozzle length of 8 mm.

Olefinic Resin Composition

The resin composition meeting the requirements for the physical properties as described above comprises olefinic resins as the principal component. An especially preferable olefinic resin composition comprises the following three components (A), (B) and (C).

A component (A) is a polyethylene which has the density of 0.900 to 0.925, preferably 0.910 to 0.925 (g/cm$^3$), the melt flow rate of 0.5 to 30, preferably 1 to 25 (g/10 min) and the ethylene unit content of not less than 95 mol %. When the density and the melt flow rate are in these ranges, the melt tension of the resin composition with components (B) and (C) is increased, consequently improving the sheet formability of the resin composition and enabling a sheet with uniform thickness and a good appearance to be obtained. Further, the melt flow rate (MFR) of the polyethylene is a value as measured at 190° C. and under a load of 2.16 kg on the basis of ASTM D-1238.

The polyethylene belonging to the category of a low-density resin may be a so-called a high-pressure low-density polyethylene manufactured under high pressure by use of a radical catalyst or a so-called a medium- or low-pressure polyethylene manufactured in the presence of not more than 5 mol % comonomer such as $\alpha$-olefin under medium or low pressure by use of a Ziegler catalyst or a metallocene catalyst, so long as the polyethylene meets the requirements for the physical properties as described above. In the case of a high-pressure polyethylene, it is supposed that branches occur along the main chain of a polyethylene in the polymerization process of the ethylene, together with branching due to the coexistent comonomer in the case of medium- or low-pressure polyethylene, and that such a moderately branched structure raises the melt tension of the overall resin composition, contributing to an improvement in processability. In the invention, especially a high-pressure polyethylene suits the object of the invention because such moderately branched structure of a high-pressure polyethylene produces a very good effect on processability.

A component (B) is an ethylene/$\alpha$-olefin copolymer which has the density of 0.855 to 0.880, preferably 0.860 to 0.870 (g/cm$^3$), the melt flow rate of 0.1 to 10, preferably 0.1 to 6 (g/10 min), the crystallinity of not more than 30% as measured by X-ray diffractometry, and the ethylene unit content of 70 to 95, preferably 75 to 90 mol %.

The ethylene/$\alpha$-olefin copolymer used here is a copolymer of ethylene and $\alpha$-olefin having 3 to 20 carbon atoms. Examples of $\alpha$-olefin include propylene, 1-butene, 1-pentene, 1-hexene, 4-methyl-1-pentene, 1-heptene, 1-octene and 1-decene. These olefins may be used singly or in combination with two or more of them in the copolymerization of ethylene. Specifically, an ethylene/propylene copolymer, an ethylene/1-butene copolymer, an ethylene/1-hexene copolymer and an ethylene/1-octene copolymer can be cited as preferable examples.

It is possible to control the degree of branching and the length of branches in the copolymer by selecting the type and content of such $\alpha$-olefin and selecting the polymerization method and conditions. In the invention, any copolymers having any branches may be used so long as they meet the requirements for the physical properties as described above.

When the measurement value of $g_\eta^*$, an index used to estimate the branched structure of a copolymer, is in a range of $0.95<g_\eta^*\leq 1.0$, it suggests that the copolymer has either short-chain branches or a relatively small number of long-chain branches and that its structure is overall close to a straight-chain structure. A resin composition comprising such copolymer provides a primary molding showing a low degree of shrinkage before the processing of foaming and has the advantage of its laminate not readily curling when laminated with the paper substrate as described below.

On the other hand, when the $g_\eta^*$ value is in a range of $0.2 \leq g_\eta^* \leq 0.95$, it suggests that the copolymer has long-chain branches and that the resin composition containing such copolymer shows excellent moldability and foamability and is suitable for use in the production of film or foamed sheet. Therefore, it is desirable to take the fabrication method of the final fabricated product and its physical properties and uses, and select a copolymer having such $g_\eta^*$ value as meet such requirements.

Wherein, the $g_\eta^*$ value is a value expressed by the ratio between the intrinsic viscosity [$\eta$] (dl/g) of an ethylene/$\alpha$-olefin copolymer as measured at 135° C. in the decalin solvent and the intrinsic viscosity [$\eta$]$_{blank}$ (dl/g) of a straight-chain ethylene/$\alpha$-olefin copolymer having about the same weight-average molecular weight as measured by the light scattering method as that of the aforesaid ethylene/α-olefin copolymer and an ethylene content of 70 mol %.

$$g_\eta^* = [\eta]/[\eta]_{blank}$$

Further this $g_\eta^*$ value can be calculated by the measurement method described in the Japanese Patent Publication No. 14045 /1991.

This copolymer is a low-crystalline or non-crystalline polymer. When its density is in the aforesaid range, the copolymer has both flexibility and heat resistance and provides moldings which are not sticky and have especially a soft feel. In addition, if its melt flow rate is in the aforesaid range, the copolymer shows good roll and extruder processability and provides not only sheets having smooth surfaces but also sheets in uniformly foamed state and with excellent mechanical properties when processed by foaming. The melt flow rate (MFR) as used here refers to the value as measured at 190° C. and under a load of 2.16 kg on the basis of ASTM D-1238.

The ethylene/α-olefin copolymer having the properties as described above may be manufactured by copolymerizing ethylene and α-olefin under normal polymerization conditions in the presence of a catalyst component combining a transition metal compound, an organoaluminum compound and/or an organoaluminum oxy-compound and as required an ionized or ionic compound, etc. For example, the ethylene/α-olefin copolymer may be manufactured by using a Ziegler catalyst combining a halide or an alkoxide compound of vanadium or titanium and an organoaluminum compound, or a metallocene catalyst represented by a combination of a zirconium compound coordinated by the compound having a cyclopentadienyl ring (metallocene) and aluminoxane.

A component (C) is a polymer always having the following physical properties: The density is 0.855 to 0.880, preferably 0.860 to 0.870 (g/cm$^3$); the melt flow rate (ASTM D-1238: 190° C., a load of 2.16 kg) is 20 to 200, preferably 25 to 150 (g/10 min); and the crystallinity as determined by X-ray diffractometry is not more than 30%.

One type of this polymer is an ethylene/α-olefin copolymer having an ethylene unit content of 70 to 95 mol %, preferably 75 to 90 mol %. It is different from the ethylene/α-olefin copolymer of the aforesaid component (B) in that it has a higher melt flow rate than that of the latter though it has practically the same properties.

Furthermore, another type of this polymer of a component (C) may be a propylene/α-olefin copolymer having a propylene unit content of 50 to 90 mol %, preferably 60 to 80 mol %. The α-olefin is an α-olefin having 2 to 20 carbon atoms, other than propylene, and a low-crystalline or non-crystalline propylene/ethylene copolymer and propylene/1-butene copolymer can be cited as examples of the aforesaid polymer.

The component (C) may be produced by the same method as that for the component (B) as described above.

The resin composition may be formed at any ratio among the aforesaid components (A), (B) and (C) so long as it meets the physical property requirements (a) through (e) as described above. Particularly, the especially preferably resin composition meeting the aforesaid physical property requirements (a) through (e) is a composition compounded at a ratio of 5 to 40, preferably 20 to 35 wt % for the component (A), 10 to 90, preferably 15 to 60 wt % for the component (B), and 5 to 60, preferably 10 to 55 wt % for the component (C). In this case, a total amount of (A), (B) and (C) is 100 wt %.

If the resin component is within such composition range, it meets the aforesaid physical property requirements (a) through (e), shows excellent calendering roll and extruder processability and foamability and provides sheets having excellent flexibility and workability. Especially, the resin composition allows mixing to be carried out in a broad range of processing temperature, enables sheets to be formed at high speed because of ease of taking-off sheets from the rolls, and makes a high expansion ratio possible in the processing of foaming.

Other synthetic resins or rubbers or additives may be added to the resin composition to such extent that the purpose of the invention is not frustrated. Examples of such additives include antioxidants, heat stabilizers, weathering stabilizers, antistatic agents, fire retardants, pigments, hydrochloric acid absorbers, fillers, dispersing agents and foaming agents.

The resin containing such additives may be mixed uniformly by use of mixers such as a Banbury mixer, kneader mixer, rolls and extruders to obtain an intended composition, which is to be turned into a fabricated product of an intended shape.

The resin composition thus obtained as described above may be fabricated into general purpose films and sheets as well as foamed sheets as described below, which may be utilized for various uses such as wall paper and packaging materials.

Fire-retardant Sheets

Fire-retardant sheets meeting the aforesaid physical property requirements (a) through (e) and showing excellent roll processability may be obtained by compounding a fire retardant to the aforesaid resin composition. In this case, 50 to 200, preferably 60 to 180 parts by weight of a fire retardant may be compounded against 100 parts by weight of the olefin resin.

For the fire retardant for use for the above purpose, organic or inorganic compounds that are normally compounded to the synthetic resin may be used. Specific examples include metal hydroxides such as magnesium hydroxide and aluminum hydroxide, inorganic compound hydrates such as alumina and hydrotalcite, metal oxides such as antimony oxide and nickel oxide, metal borate salts such as magnesium borate and zinc borate, phosphorus-based compounds such as organic phosphoric ester and ammonium primary phosphate, halogen compounds such as organic bromine or chlorine compounds, kaolin clay, ferrocene, silicone compounds and mixtures of these.

These fire retardants may be used singly or in combination with two or more of them. Out of them, inorganic compounds such as metal hydroxides, inorganic compound hydrates and antimony oxides are preferable, and especially metal hydroxides or a mixture of metal hyroxide and other inorganic compound are preferable. Furthermore, for the purpose of improving their compatibility with the resin component and causing them to be dispersed uniformly in the resin component, fire retardants may be added directly to the resin composition together with dispersing agents such as higher aliphatic acid, aliphatic amide, aliphatic ester, paraffin, wax, silane coupling agents and higher alcohol, or compounded to the resin composition after the surfaces of the fire retardants are treated with such dispersing agents.

Foamed Resin Sheets

The foamed resin sheet of the invention may be produced easily by adding a foaming agent to the aforesaid resin composition, compounding additives such as a fire retardant as required, and putting them under foaming temperature and pressure conditions. At that time, a method may be adopted in which a resin sheet yet to be foamed is first formed from the resin composition to which a foaming agent has been added and it is then turned into a foamed resin sheet by raising temperature, or another method may be employed in which a foamed resin sheet is produced directly from the resin composition to which a foaming agent has been added.

Taking the method and temperature for fabricating the aforesaid foamed resin sheet into consideration, an usable foaming agent is selected as required from among chemical and physical foaming agents. Examples of such chemical foaming agents include azo compounds such as azodicarbonamide and $\alpha,\alpha'$-azobisisobutyronitrile, hydrazine compounds such as benzene sulfonyl hydrozide, p-toluence sulfonyl hydrazide, and p,p'-oxybis(benzenesulfonyl hydrazide), and nitroso compounds such as N,N'-dinitrosopentamethylene tetramine. These are decomposed under molding conditions, generating gases for the processing of foaming.

Examples of physical foaming agents include carbondioxide, halogenized hydrocarbons such as difluorodichloromethane, and hydrocarbons such as butane, pentane, hexane, cyclobutane and cyclohexane. All of these are gasified under molding conditions, contributing to the process of foaming. Foaming agents may be used singly or in combination with two or more of them.

In the case of the method in which a resin sheet yet to be foamed is first formed from the resin composition to which a foaming agent has been added by means of rolls or an extruder and then the resin sheet is subjected to foaming conditions in the formation of foamed sheets, use of chemical foaming agents, rather than physical foaming agents, is preferable. Particularly, azodicarbonamide is suitable since it allows processing to be conducted in a stable manner. At the time of forming a resin sheet yet to be foamed first by use of an extruder, the temperature in the extruder is brought below the decomposition temperature of the foaming agent. However, since the resin composition of the invention allows a rise in the resin temperature due to the exothermic value by shear force to be controlled to a minimum, it enables a sheet yet to be foamed to be formed satisfactorily. Especially, use of a barrier-type mixing screw brings about an improvement in productivity. The resin yet to be foamed can then be turned into a foamed sheet by heating it by means of an air oven or heating rolls. The resin composition of the invention is suitable especially for use in the production of foamed sheets by this method.

On the other hand, in the case of producing a foamed resin sheet by feeding the resin composition to an extruder, while supplying a foaming agent to the extruder through another inlet under pressure, and then taking off a foamed resin sheet directly from the die, a physical foaming agent is generally used, and particularly carbon dioxide and flon gas are preferable. Further, it is also possible to feed the resin composition to which a foaming agent has been added in advance to an extruder and take off a foamed resin sheet directly from the die. In this case, either chemical or physical foaming agent may be used.

The expansion ratio of the foamed resin sheet thus obtained is 2.5 to 10, preferably 3 to 8 times, and air bubbles having an even diameter are dispersed uniformly in the sheet. With the surfaces of the sheet being smooth, the sheet on the whole is flexible. Because of this, the sheet is suitable for use as a wall paper material as described below and may be used for various products such as general packaging materials and cushioning materials.

Wall Papers

The wall paper of the invention has such structure that the aforesaid foamed resin sheet is laminated onto the paper substrate in an integrated manner. Paper 0.1 to 0.2 mm thick is normally used for the paper substrate layer, with dimensional and morphological stability taken into consideration. The foamed resin sheet layer is 0.5 to 1.5 mm in thickness as a result of controlling the expansion ratio to 2.5 to 10, preferably 3 to 8 times. Consequently, this foamed resin sheet layer is bulky and gives a good feel. The surface of the foamed sheet layer is given a design as wall paper through printing, embossing, graining, etc. Its front surface may be provided with a protective layer as needed, and the back side of the paper substrate may be provided with an adhesive layer for the wall surface as needed.

The paper substrate that may be used is selected from among the paper made from natural pulp or synthetic pulp and paper made from such pulp to which inorganic matter has been added, to suit the purpose of use of the wall paper. Since the foamed resin sheet layer to which a fire retardant has been compounded shows fire retardance by itself, it may be used for general uses without requiring the paper substrate to have fire retardance. However, as the use of a fire-retardant paper containing inorganic matter, such as aluminum hyroxide paper, improves the fire retardance of the wall paper, the use of such fire-retardant paper is desirable for the sake of improving the disaster prevention properties of the wall paper.

The production of wall paper may be accomplished by putting a resin sheet previously foamed on the paper substrate and laminating them by using an adhesive between the two layers or by laminating the two layers under pressure by extruding a melted polyethylene resin, etc. between the layers. In carrying out the lamination, strong adhesion may be achieved for the bonding surface of the foamed resin sheet previously subjected to oxidation treatment such as corona discharge treatment, and therefore such oxidation treatment is preferable for the foamed resin sheet to be laminated.

There is also another method for producing wall paper in which a resin sheet previously formed but yet to be foamed is laminated in advance onto the paper substrate or a resin sheet yet to be foamed is laminated directly onto the paper substrate, and then such laminate is placed under foaming conditions by means of passing the laminate through a heating oven or heating rolls, for example, to foam it so that a wall paper is obtained with the foamed resin sheet laminated on the paper substrate. It is also possible to produce a wall paper by conducting lamination and foaming at the same time by laminating the resin composition to which a foaming agent is added or injected directly onto the paper substrate from an extruder or calendering rolls.

EXAMPLES

The invention will be understood more readily with reference to the following examples; however these examples are intended to illustrate the invention and are not to be constructed to limit the scope of the invention.

First, the properties of the polyethylene resins (A-1 and A-2), ethylene/$\alpha$-olefin copolymers (B-1 to B-6) and ethylene/$\alpha$-olefin copolymer (C-1) are shown in Table 1.

TABLE 1

| Type of Resin | Ethylene Unit Content (mol %) | Type of α-olefin | Density (g/cm³) | MFR (g/10 min) | $g_\eta^*$ Value |
|---|---|---|---|---|---|
| A-1 | High-pressure LDPE | — | 0.917 | 7.2 | — |
| A-2 | High-pressure LDPE | — | 0.916 | 23 | — |
| B-1 | 81 | C₄ | 0.860 | 0.2 | 1.00 |
| B-2 | 81 | C₄ | 0.860 | 0.5 | 1.00 |
| B-3 | 81 | C₄ | 0.860 | 0.5 | 0.85 |
| B-4 | 81 | C₄ | 0.860 | 3.6 | 1.00 |
| B-5 | 81 | C₄ | 0.860 | 6.2 | 1.00 |
| B-6 | 92 | C₈ | 0.870 | 5.0 | 0.88 |
| C-1 | 81 | C₄ | 0.860 | 35.0 | 1.00 |

\* In the above Table, $C_4$ stands for 1-butene, $C_8$, 1-octene.
\*\* High-pressure LDPE refers to a low-density polyethylene manufactured by the high-pressure process.
\*\*\* The $g_\eta^*$ value is a value expressed by the ratio between the intrinsic viscosity $[\eta]$ (dl/g) of ethylene/α-olefin copolymer as measured at 135° C. in the decalin solvent and the intrinsic viscosity $[\eta]_{blank}$ (dl/g) of straight-chain ethylene/α-olefin copolymer having about the same weight-average molecular weight as measured by the light scattering method as that of the aforesaid ethylene/α-olefin copolymer and an ethylene content of 70 mol %. That is, $g_\eta = [\eta]/[\eta]_{blank}$
Further this $g_\eta^*$ value was calculated by the measurement method described in the Japanese Patent Publication No. 14045/1991.

Examples 1 Through 5

Comparative Examples 1 Through 4

Compositions were prepared by blending the aforesaid polyethylene resins (A-1 and A-2), ethylene/α-olefin copolymers (B-1 through B-6) and ethylene/α-olefin copolymer (C-1) at the ratio (wt %) described in Table 2 and mixing them at a set temperature of 170° C. using a 40-mmφ single screw extruder. The physical properties of these compositions were measured and shown in Table 2. The physical properties were measured by the same methods as described above.

Next, compounds were obtained by adding 100 parts by weight of magnesium hydroxide as a fire retardant and 6 parts by weight of azodicarbonamide (decomposition temperature: 165° C.) as a foaming agent to 100 parts by weight of the resin compositions shown in Table 2 and mixing them at a set temperature of 120° C. by use of a Banbury mixer.

After that, a sheet 150 μm thick was prepared from the aforesaid compounds by use of a calendering machine. The machine used had four rolls (C1 to C4) arranged in an inverted L shaped configuration. The diameter of each roll was 6 inches, and the roll temperature was as follows:

C1/C2/C3/C4=120 to 121° C./121 to 122° C./122° C./123° C.

The speed of sheet calendering on the calendering machine is shown in Table 2. In Examples 1 through 5, high-speed stable sheet formation was possible, but it was impossible to increase the calendering speed to form sheets stably in the case of Comparative Examples 1 through 4.

The formed sheets were sent to the nip rolls together with the paper substrate and milled to be laminated onto the paper substrate. The curling condition of the laminate at that time was observed, and the results of the observation are shown in Table 2. No curling occurred in any of the Examples or the Comparative Examples.

Next, the sheets thus obtained were put in an electric oven at 220° C. for 2 minutes to decompose the foaming agent to produce foamed sheets. The expansion ratios of the resulting foamed sheets, all of which were approximately 4 times, are also shown in Table 2.

TABLE 2

| Resin Composition and Physical Properties | Examples | | | | | Comparative Examples | | | |
|---|---|---|---|---|---|---|---|---|---|
| | 1 | 2 | 3 | 4 | 5 | 1 | 2 | 3 | 4 |
| Resin component: | | | | | | | | | |
| A-1 | 30 | 30 | — | — | 30 | — | 30 | — | 30 |
| A-2 | — | — | 30 | 30 | — | — | — | — | — |
| B-1 | — | — | 30 | 20 | — | — | — | — | — |
| B-2 | 25 | 20 | — | — | — | — | — | — | — |
| B-3 | — | — | — | — | 25 | — | — | — | — |
| B-4 | — | — | — | — | — | 100 | — | — | 35 |
| B-5 | — | — | — | — | — | — | 70 | — | — |
| B-6 | — | — | — | — | — | — | — | 100 | — |
| C-1 | 45 | 50 | 40 | 50 | 45 | — | — | — | 35 |
| Physical properties of resin composition | | | | | | | | | |
| Density | 0.880 | 0.880 | 0.880 | 0.880 | 0.880 | 0.880 | 0.880 | 0.870 | 0.880 |
| MFR | 4.4 | 6.0 | 2.7 | 6.1 | 4.5 | 3.6 | 6.0 | 5.0 | 8.0 |
| Δtanδ | 1.15 | 1.08 | 1.25 | 1.09 | 1.04 | 2.06 | 1.78 | 1.38 | 1.33 |
| tanδ | 1.38 | 1.51 | 1.13 | 1.42 | 1.35 | 2.02 | 1.86 | 1.59 | 1.84 |
| Melt tension | 64 | 52 | 78 | 45 | 72 | 10 | 50 | 16 | 50 |
| Calendering Speed (m/min) | 5.5 | 6.5 | 5.0 | 7.0 | 6.5 | 2.5 | 3.0 | 3.0 | 3.5 |
| Expansion ratio (times) | 4.3 | 4.1 | 4.5 | 4.0 | 4.4 | 3.6 | 4.5 | 4.2 | 4.1 |
| Curling condition | ○ | ○ | ○ | ○ | ○ | ○ | ○ | ○ | ○ |

\*A symbol ○ indicates that the sheet did not curl.

Effect of the Invention

The resin composition of the invention may enable sheet formation speed to be increased because its feed to the calendering rolls and its taking-up from the rolls have been improved and bank stability has been secured as a result of controlling its density, melt flow rate, viscoelastic properties and melt tension within particular ranges. As a consequence, sheets will be obtained which are flexible, show high accuracy in thickness, have smooth surfaces, and give an excellent feel.

It will be possible to extrude sheets yet to be foamed without causing the decomposition of the foaming agent for avoiding a sharp rise in the resin temperature in the extruder, because the resin composition of the invention is suitable for the production of sheets by extrusion and further allows the exothermic value by shear force to be reduced to a low or minimum level even at the time of sheet forming below the decomposition temperature of a chemical foaming agent. It will be also possible to obtain foamed sheets having the same physical properties as described before from the sheets yet to be foamed.

Further, since the resin composition is made up of at least three polymer components and a fire retardant, etc. as needed, it has excellent roll processing and extrudability and provides sheets having flexibility and good dimensional stability and appearance and moldings having fire retardance.

On the other hand, the resin composition may show good foaming properties because of its high melt tension, and may allow foam whose bubbles have uniform shape and is uniformly dispersed. Because of this, the resin composition will provide foamed resin sheets having flexibility and a good appearance. Especially, the resin composition makes sheet formation at a high expansion ratio possible. When these foamed resin sheets are laminated onto the paper substrate, the resulting laminates will be bulky and have the surface layer giving a good feel, making them suitable for use as wall paper.

It is further understood by those skilled in the art that the foregoing description is a preferred embodiment of the disclosed resin composition and their moldings, and that various changes and modifications may be made in the invention without departing from the spirit and scope thereof.

What we claim is:

1. An olefinic resin composition comprising olefinic resins and having the following physical properties:
   (a) a density of 0.870 to 0.890 (g/cm$^3$),
   (b) a melt flow rate as measured at 190° C. and under a load of 2.16 kg of 2 to 10 (g/10 min),
   (c) a $\Delta \tan \delta$ at 120° C. of 0.5 to 1.30, wherein $\Delta \tan \delta$ of an absolute value of a difference between $\ln(\tan \delta)$ at 1 (rad/sec) and $\ln(\tan \delta)$ at 100 (rad/sec),
   (d) a $\tan \delta$ as measured at 120° C. and 10 (rad/sec) of 0.3 to 2.0, and
   (e) a melt tension at 150° C. of 25 to 200 mN.

2. An olefinic resin composition according to claim 1, wherein the olefinic resins comprise:
   (A) a polyethylene which has a density of 0.900 to 0.925 (g/cm$^3$), a melt flow rate of 0.5 to 30 (g/10 min) and an ethylene unit content of not less than 95 mol %,
   (B) an ethylene/α-olefin copolymer which has a density of 0.855 to 0.880 (g/cm$^3$), a melt flow rate of 0.1 to 10 (g/10 min), a crystallinity of not more than 30% as measured by X-ray diffractometry, and an ethylene unit content of 70 to 95 mol %, and
   (C) an ethylene/α-olefin copolymer which has a density of 0.855 to 0.880 (g/cm$^3$), a melt flow rate of 20 to 200 (g/10 min), a crystallinity of not more than 30% as measured by X-ray diffractometry, and an ethylene unit content of 70 to 95 mol %, or a propylene/α-olefin copolymer having a propylene unit content of 50 to 90 mol %.

3. An olefinic resin composition according to claim 2, wherein the olefinic resins comprise 5 to 40 wt % of the component (A), 10 to 90 wt % of the component (B) and 5 to 60 wt % of the component (C), wherein the total amount of (A), (B) and (C) being 100 wt %.

4. An olefinic resin composition according to claim 2 or 3, wherein the ethylene/α-olefin copolymer of the components (B) and (C) are any one of copolymer selected from the group consisting of an ethylene/propylene copolymer, an ethylene/1-butene copolymer, an ethylene/1-hexene copolymer and an ethylene/1-octene copolymer.

5. An olefinic resin composition according to claim 2 or 3, wherein the propylene/α-olefin copolymer of the component (C) is a propylene/ethylene copolymer or a propylene/1-butene copolymer.

6. An olefinic resin composition as in any one of claims 2 or 3, further comprising 50 to 200 parts by weight of a fire retardant compounded to 100 parts by weight of the olefinic resins.

7. An olefinic resin composition as in any one of claims 2 or 3, further comprising a foaming agent compounded to the olefinic resins.

8. A fire-retardant sheet formed by molding the olefinic resin composition according to claim 6 into a sheet.

9. A foamed resin sheet formed by molding the olefinic resin composition according to claim 7 into a sheet at an expansion ratio of 2.5 to 10 times.

10. A wall paper formed by laminating the foamed resin sheet according to claim 9 onto a paper substrate.

11. An olefinic resin composition according to claim 1, further comprising 50 to 200 parts by weight of fire retardant compounded to 100 parts by weight of the olefinic resins.

12. An olefinic resin composition according to claim 4, further comprising 50 to 200 parts by weight of fire retardant compounded to 100 parts by weight of the olefinic resins.

13. An olefinic resin composition according to claim 1, further comprising foaming agent compounded to the olefinic resins.

14. An olefinic resin composition according to claim 4, further comprising foaming agent compounded to the olefinic resin.

15. An olefinic resin composition according to claim 14, wherein component (C) comprises propylene/ethylene copolymer or propylene/1-butene copolymer.

16. A fire-retardant sheet formed by molding the olefinic resin composition according to claim 11 into a sheet.

17. A foamed resin-sheet formed by molding the olefinic resin composition according to claim 13 into a sheet.

18. A wall paper formed by laminating the foamed resin sheet according to claim 17 onto a paper substrate.

19. The composition according to claim 2, wherein the component (C) is said ethylene/α-olefin copolymer having an ethylene unit content of 70 to 95 mol %.

20. The composition according to claim 2, wherein the component (C) is said propylene/α-olefin copolymer having a propylene unit content of from 50 to 90 mol %.

21. The composition according to claim 3, wherein the component (C) is said ethylene/α-olefin copolymer having an ethylene unit content of 70 to 95 mol %.

22. The composition according to claim 3, wherein the component (C) is said propylene/α-olefin copolymer having a propylene unit content of from 50 to 90 mol %.

23. The composition according to claim 2, wherein the olefinic resin composition comprises, from 20 to 35 wt % (A), from 15 to 60 wt % (B) and from 10 to 55 wt % (C), where the total amount of (A), (B) and (C) is 100 wt %.

* * * * *